(12) United States Patent  (10) Patent No.: US 8,525,913 B2
Kim et al.  (45) Date of Patent: Sep. 3, 2013

(54) DIGITAL PHOTOGRAPHING APPARATUS, METHOD OF CONTROLLING THE SAME, AND COMPUTER-READABLE STORAGE MEDIUM

(75) Inventors: Hye-jin Kim, Seoul (KR); Jun-ho Choi, Seoul (KR); Sung-ho Eun, Seoul (KR); Na-ri Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 12/841,303

(22) Filed: Jul. 22, 2010

(65) Prior Publication Data

US 2011/0032406 A1  Feb. 10, 2011

(30) Foreign Application Priority Data

Aug. 7, 2009 (KR) ........................ 10-2009-0072739

(51) Int. Cl.
*H04N 5/222* (2006.01)
*H04N 5/76* (2006.01)

(52) U.S. Cl.
USPC .................................. 348/333.02; 348/231.5

(58) Field of Classification Search
USPC ................... 348/333.02, 231.2, 231.3, 231.4, 348/231.5
See application file for complete search history.

(56) References Cited

U.S. PATENT DOCUMENTS

| 7,106,375 B2* | 9/2006 | Venturino et al. ....... 348/333.02 |
| 2001/0026263 A1* | 10/2001 | Kanamori et al. ............ 345/156 |
| 2002/0171747 A1* | 11/2002 | Niikawa et al. .......... 348/333.01 |
| 2003/0090572 A1* | 5/2003 | Belz et al. ................. 348/207.1 |
| 2003/0160878 A1* | 8/2003 | Nagao ........................ 348/231.3 |
| 2007/0013788 A1* | 1/2007 | Kaibara ..................... 348/231.2 |
| 2009/0185792 A1* | 7/2009 | Braunstein et al. ........... 386/117 |

FOREIGN PATENT DOCUMENTS

JP  2008-228053 A  *  9/2008

* cited by examiner

*Primary Examiner* — James Hannett
(74) *Attorney, Agent, or Firm* — Drinker Biddle & Reath LLP

(57) ABSTRACT

A method of controlling a digital photographing apparatus including a plurality of display units includes displaying a replay image file on a first display unit, determining whether additional information exists in the replay image file, searching for the additional information when the additional information exists in the replay image file, and displaying the additional information on a second display unit.

36 Claims, 12 Drawing Sheets

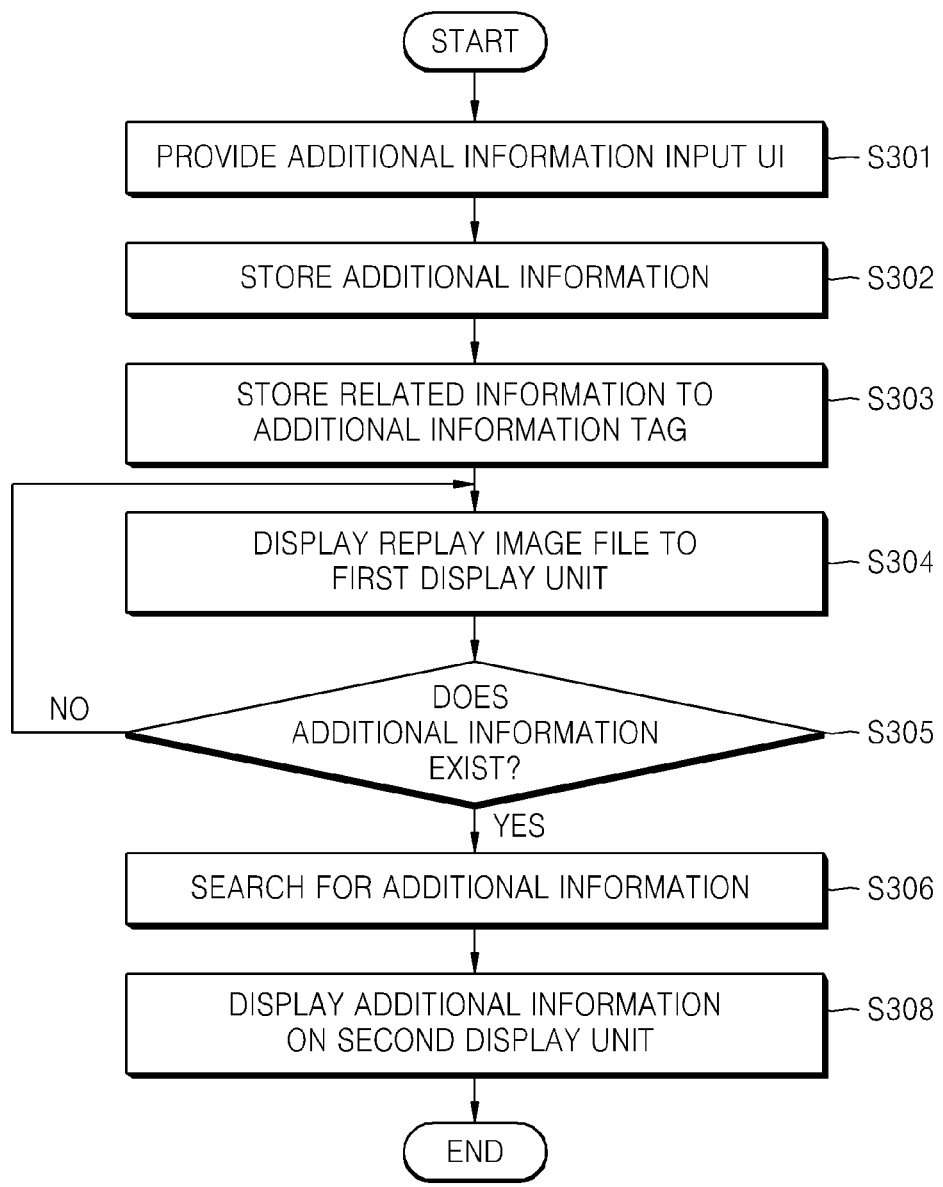

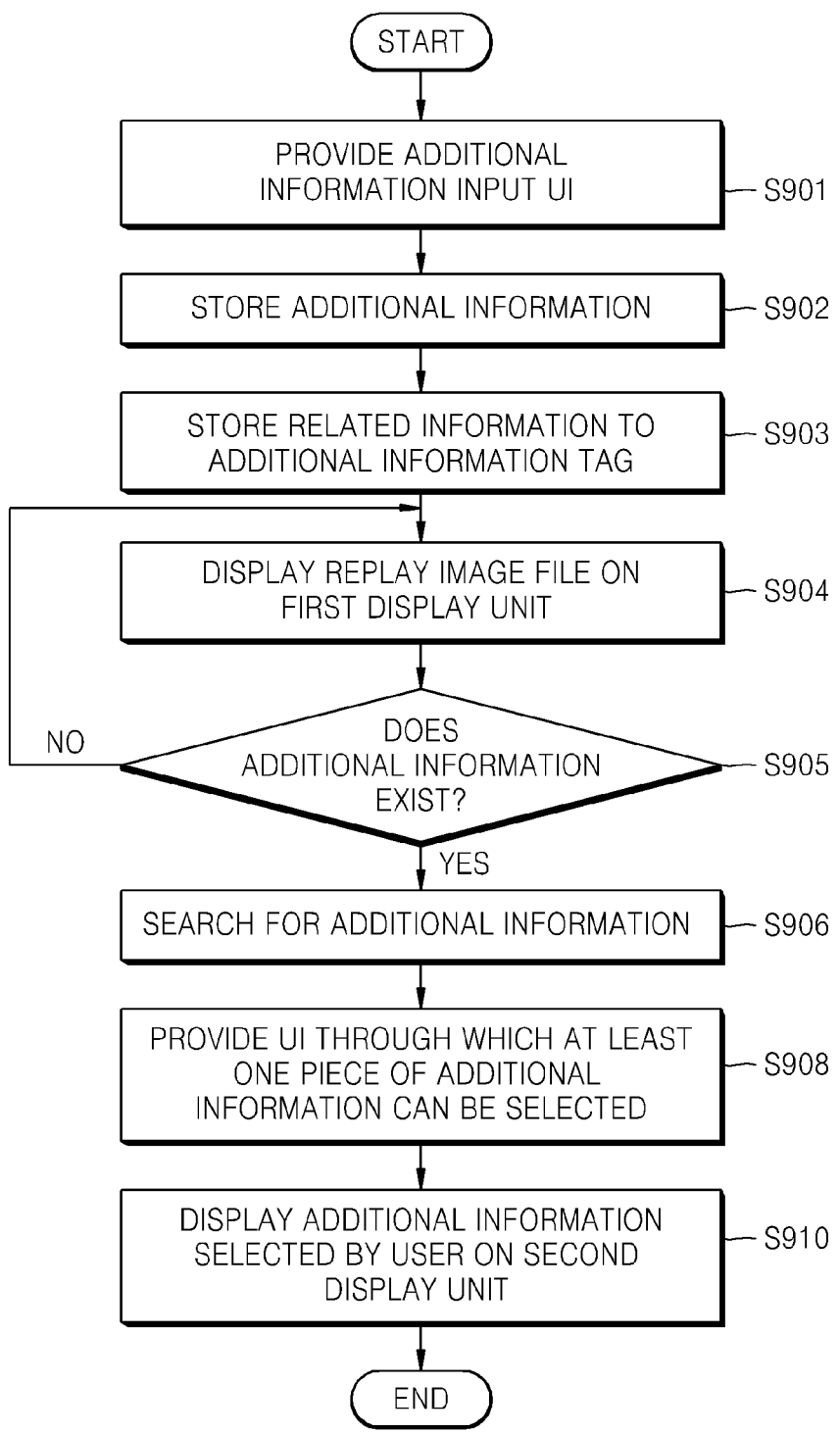

DIGITAL PHOTOGRAPHING APPARATUS, METHOD OF CONTROLLING THE SAME, AND COMPUTER-READABLE STORAGE MEDIUM

CROSS-REFERENCE TO RELATED PATENT APPLICATION

This application claims the priority benefit of Korean Patent Application No. 10-2009-0072739, filed on Aug. 7, 2009, in the Korean Intellectual Property Office, the disclosure of which is incorporated herein in its entirety by reference.

BACKGROUND

1. Field of the Invention

Embodiments relate to a digital photographing apparatus, a method of controlling the digital photographing apparatus, and a computer readable storage medium having embodied thereon a computer program for executing the method, and more particularly, to a digital photographing apparatus including a plurality of display units, a method of controlling the digital photographing apparatus, and a computer readable storage medium having embodied thereon a computer program for executing the method.

2. Description of the Related Art

When capturing an image using a digital photographing apparatus, a user may also store additional information related to the image. For example, a memo about a subject, image data related to the subject, a sound memo, etc., may be stored together with the captured image. Various applications for inputting the additional information for the user are available. In particular, as digital photographing apparatuses including a touch screen are widely available, the user may more easily input additional information thereto.

Digital photographing apparatuses use a predetermined file format; in particular, an exchangeable image file format (Exif) for an image file is widely used. In an image file according to the Exif format, various data such as the manufacturer of a camera, a camera model, a date of correcting the image, a date of photographing, an exposure time, etc., may be stored, and also, a storage area for a maker note which can be easily used by the manufacturer is included.

SUMMARY

Embodiments include a digital photographing apparatus that stores additional information related to a captured image, in which the additional information may be displayed without hiding a replay image when viewing the additional information, a method of controlling the digital photographing apparatus, and a non-transient computer readable storage medium for storing a computer program for executing the method.

Embodiments also include a user interface through which contents to be displayed on a second display unit may be controlled by a first display unit.

According to an embodiment, a method of controlling a digital photographing apparatus having a plurality of display units includes displaying a replay image file on a first display unit, determining whether additional information exists in the replay image file, searching for the additional information when the additional information exists in the replay image file, and displaying the additional information on a second display unit.

The method may further include providing a user interface through which the user inputs the additional information to a captured image or a stored image file, storing the additional information input by the user, and storing information on a type and an address of the additional information in an additional information tag of the captured image or the stored image file, wherein the replay image file is the captured image or the stored image file.

The method may further include displaying an additional information icon that displays the type of the additional information on the first display unit when additional information exists in the replay image file.

The method may further include providing a second display unit controlling the user interface when at least one piece of the additional information exists, through which additional information to be displayed on the second display unit among the at least one piece of additional information can be selected; and displaying the selected additional information on the second display unit.

The method may further include providing a screen exchange user interface through which a screen displayed on the first display unit and a screen displayed on the second display unit are exchanged in response to a user input, and exchanging a screen displayed on the first display unit and a screen displayed on the second display unit in response to the user input through the screen exchange user interface.

The additional information which is added to the replay image file may include at least one of image data, text data, global positioning system (GPS) data, and sound data.

The additional information tag may include at least one piece of information selected from the group consisting of information on whether additional information exists, a type of the additional information, and an address where the additional information is stored. The determining whether the additional information exists may include searching for the additional information tag of the replay image file. The step of storing the additional information may include storing the additional information under a same base file name as the replay image file with a different file extension.

The first display unit may be disposed on a surface opposite to a surface on which a lens barrel of the digital photographing apparatus is located, and the second display unit may be disposed on the surface on which the lens barrel is located.

According to another embodiment, a digital photographing apparatus includes a first display unit, a second display unit, an image display control unit that displays a replay image file on the first display unit, an additional information providing unit that determines whether additional information exists in the replay image file, and when additional information exists, searches for the additional information, and an additional information display control unit that displays the additional information on the second display unit.

According to another embodiment, a non-transitory computer readable storage medium stores thereon a computer program executable by a processor for performing a method of controlling a digital photographing apparatus having a first display unit and a second display unit. The method includes displaying a replay image file on the first display unit, determining whether additional information exists in the replay image file, searching for the additional information when the additional information exists in the replay image file, and displaying the additional information on the second display unit.

According to an embodiment, a display unit that is different from a display unit on which an image is displayed is used to view additional information related to the image. Thus, the additional information can be viewed without hiding the displayed image.

Furthermore, a user interface, through which contents of the additional information displayed on the second display unit can be controlled from the first display unit, may be used to effectively control the contents by using a plurality of display units.

BRIEF DESCRIPTION OF THE DRAWINGS

The above and other features and advantages will become more apparent by describing in detail exemplary embodiments with reference to the attached drawings in which:

FIG. 3 is a flowchart illustrating a method of controlling a digital photographing apparatus, according to an embodiment;

FIG. 9 is a flowchart illustrating a method of controlling a digital photographing apparatus, according to another embodiment;

DETAILED DESCRIPTION

Hereinafter, preferred embodiments will be described with reference to the attached drawings. The description below and the attached drawings are provided for better understanding of operations of the embodiments, and elements that may be easily realized by one of ordinary skill in the art may be omitted.

Also, the embodiments and the drawings are not for purposes of limitation, and thus the scope of the invention is defined by the appended claims. The meaning of the terms used in the specification and claims should be construed as meanings and concepts not departing from the spirit and scope of the invention based on the principle that the inventor is capable of defining concepts of terms in order to describe embodiments of his or her invention in the most appropriate way.

Figure 1:
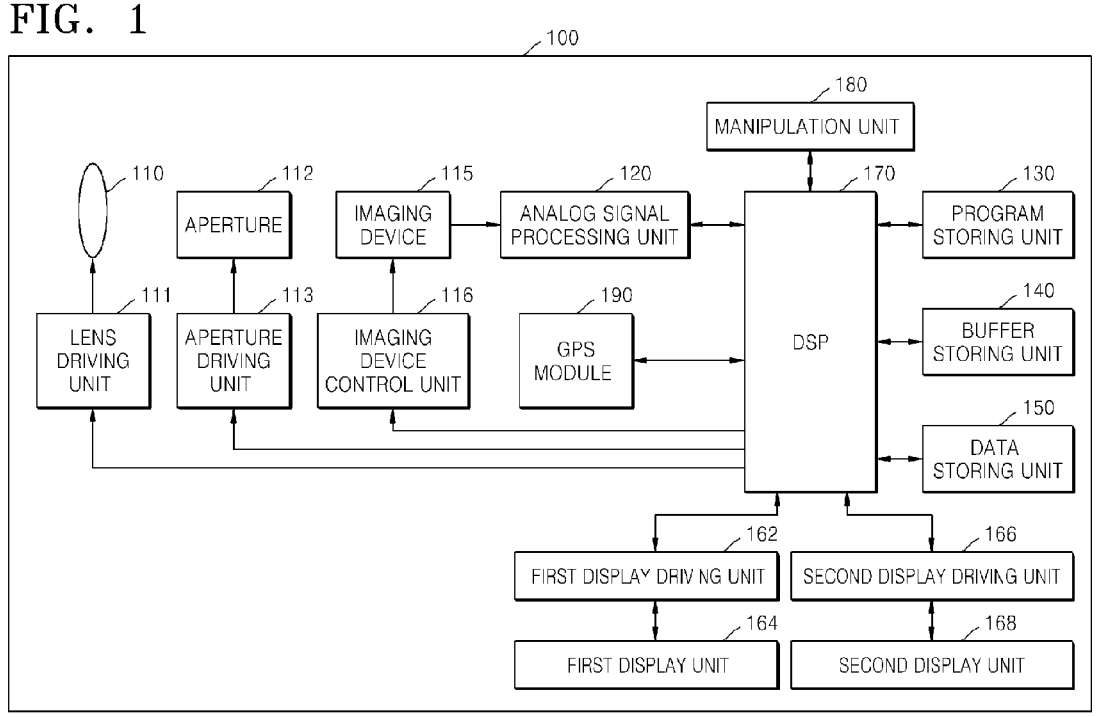
FIG. 1 is a schematic block diagram illustrating a digital photographing apparatus, according to an embodiment.

FIG. 1 is a schematic block diagram illustrating a digital photographing apparatus 100, according to an embodiment.

The digital photographing apparatus 100 includes a lens 110, a lens driving unit 111, an aperture 112, an aperture driving unit 113, an imaging device 115, an imaging device control unit 116, an analog signal processing unit 120, a program storing unit 130, a buffer storing unit 140, a data storing unit 150, a first display driving unit 162, a first display unit 164, a second display driving unit 166, a second display unit 168, a digital signal processing unit 170, and a manipulation unit 180.

The lens 110 focuses an optical signal. The lens 110 may include a zoom lens that controls an angle of view to be narrower or wider according to a focal length and a focus lens adjusting a focal point of a subject. The lens 110 may be one lens or a group of a plurality of lenses.

The aperture 112 adjusts an amount of incident light by adjusting a degree of opening of the aperture 112.

The lens driving unit 111 and the aperture driving unit 113 receive a control signal transmitted from the digital signal processing unit 170 to drive the lens 110 and the aperture 112, respectively. The lens driving unit 111 adjusts a position of the lens 110 to adjust a focal length and conduct operations such as auto-focusing, zoom changing, focus changing, etc. The aperture driving unit 113 adjusts the degree of opening of the aperture 112, and particularly, adjusts an f number to conduct operations such as auto-focusing, automatic exposure adjustment, focal point changing, adjusting of a depth of field, etc.

An optical signal transmitted through the lens 110 reaches a light receiving surface of the imaging device 115 to form an image of a subject. The imaging device 115 may include a charge-coupled device (CCD) or a complementary metal oxide semiconductor image sensor (CIS) that converts an optical signal into an electrical signal. Sensitivity of the imaging device 115 may be adjusted by the imaging device control unit 116. The imaging device control unit 116 may control the imaging device 115 according to a control signal that is automatically generated by an image signal input in real-time or a control signal that is manually input through manipulation by the user.

An exposure time of the imaging device 115 is adjusted by using a shutter (not shown). The shutter may include a mechanical shutter that moves a cover to adjust incident light or an electronic shutter that controls exposure by supplying an electrical signal to the imaging device 115.

The analog signal processing unit 120 performs operations such as noise reduction processing, gain adjustment, waveform typifying, analog-digital conversion processing, etc. with respect to an analog signal supplied from the imaging device 115.

The manipulation unit 180 is a unit through which a control signal is input from the outside, for example, by the user. The manipulation unit 180 may include various functional buttons such as a shutter-release button for inputting a shutter-release signal for capturing an image by exposing the imaging device 115 for a predetermined period of time, a power button for inputting a control signal for turning on or off the digital photographing apparatus, a wide angle-zoom button and a telephoto-zoom button for widening or narrowing an angle of view according to an input signal, and functional buttons etc., for a white balance setup function selection, for an exposure setup function button, for mode selection of a text input mode, a photographing mode, or a replay mode, etc. The manipulation unit 180 may have various buttons as described above, but is not limited thereto. The manipulation 180 may be in any form such as a keyboard, a touch pad, a touch screen, a remote controller, etc., through which a user may input a control signal.

Also, the digital photographing apparatus 100 includes a program storing unit 130 that stores programs such as an operation system, an application system, etc. that drive the digital photographing apparatus 100, a buffer storing unit 140 that temporarily stores data needed for calculation or results of the calculation, and a data storing unit 150 that stores various data, e.g., an image file including an image signal.

Also, the digital photographing apparatus 100 includes a first display unit 164 and a second display unit 168 that display an operation of the digital photographing apparatus 100 or image data that is captured by the digital photographing apparatus 100. The first display unit 164 and the second display unit 168 may provide visual and/or audio data to the user. For example, to provide visual information, the first display unit 164 and the second display unit 168 may include a liquid crystal display (LCD), an organic light emitting display panel (OLED), etc. The first display driving unit 162 and the second display driving unit 166 supply driving signals to the first display unit 164 and the second display unit 168, respectively.

The digital photographing apparatus 100 includes a digital signal processing unit 170 that processes an image signal input thereto, and controls each of the above-described elements according to the processed image signal or an external input signal. The digital signal processing unit 170 may reduce noise with respect to input image data, and may perform image signal processing for improving image quality, such as gamma correction, color filter array interpolation, color correction, color enhancement, etc. Also, the digital signal processing unit 170 may compress the image data generated by performing image signal processing thereon so as to improve the image quality thereof, thereby generating an image file, or may restore image data from the image file. A compression format of the image data may be a reversible format or an irreversible format. Examples of the appropriate format are a joint photographic experts group (JPEG) format and a JPEG 2000 format. The compressed image data may be stored in the data storing unit 150. Also, the digital signal processing unit 170 may functionally perform obscuring, coloring, blurring, edge emphasis, image interpretation, image recognition, image effects, etc. In the image recognition, face recognition or scene recognition may be performed. The digital signal processing unit 170 may perform display image signal processing in order to display the image data in the first display unit 164 and the second display unit 168. For example, the digital signal processing unit 170 may perform display image signal processing such as luminance level adjustment, color correction, contrast adjustment, outline emphasis adjustment, screen division processing, synthesis of images, etc. The digital signal processing unit 170 may be connected to an external monitor and perform predetermined image signal processing so as to display the image data on the external monitor, and transmit the image data processed in this manner so as to be displayed on the external monitor.

Also, the digital signal processing unit 170 executes programs stored in the program storing unit 130 or may generate a control signal for controlling auto-focusing, zoom-changing, focus changing, automatic exposure correction, etc. by using an additional module to provide the control signal to the lens driving unit 111, the aperture driving unit 113, and the imaging device control unit 116 and control the operations of the elements included in the digital photographing apparatus 100 such as a shutter, a flash, etc.

A GPS module 190 may receive a plurality of satellite signals to calculate a position of the digital photographing apparatus 100. Preferably, at least three satellite signals are used to calculate the position of the digital photographing apparatus 100 according to a triangular method by measuring exact time and distance from at least three satellites.

Figure 2A:
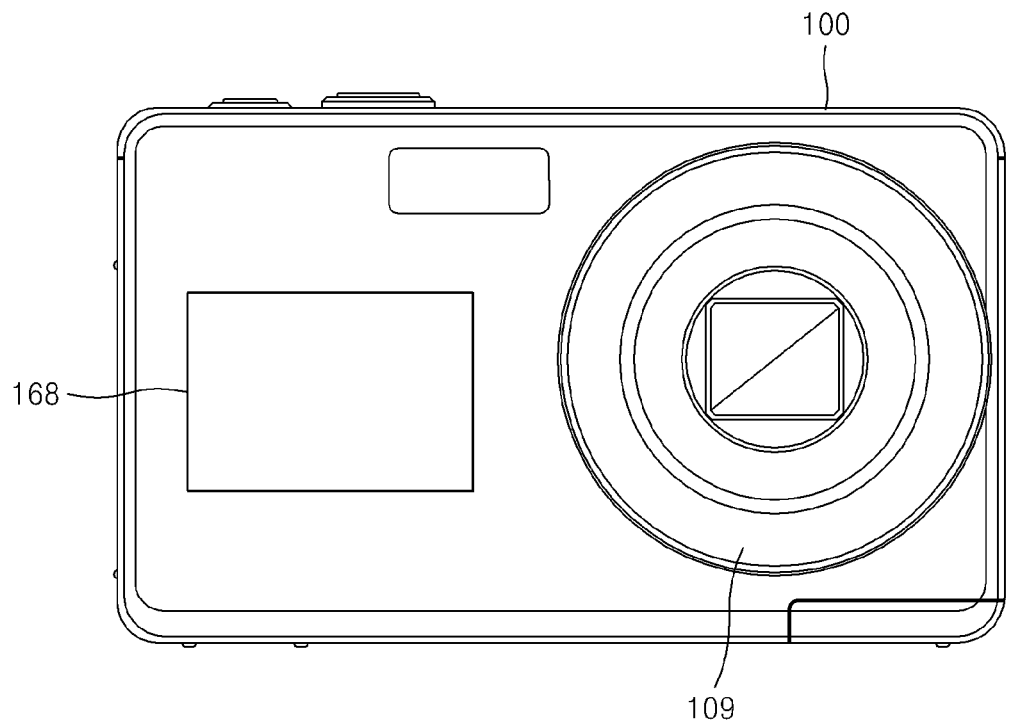
FIGS. 2A and 2B are schematic views illustrating the external appearance of the digital photographing apparatus, according to an embodiment.
Figure 2B:
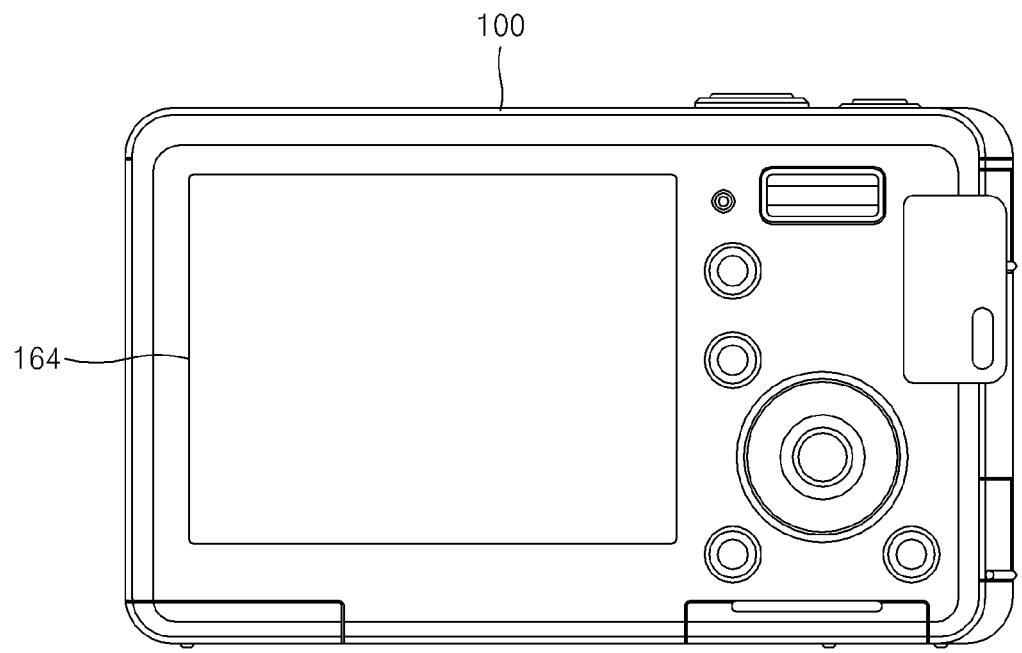

FIGS. 2A and 2B are schematic views illustrating the external appearance of the digital photographing apparatus 100, according to an embodiment.

The digital photographing apparatus 100 may include the first display unit 164 and the second display unit 168 on a rear surface and a front surface of the digital photographing apparatus 100, respectively. As illustrated in FIG. 2A and FIG. 2B, the first display unit 164 may be disposed on a surface opposite to a surface where a lens barrel 109 is disposed, and the second display unit 168 may be disposed on the same surface as the lens barrel 109.

FIG. 3 is a flowchart illustrating a method of controlling a digital photographing apparatus, according to an embodiment.

According to the current embodiment, when the digital photographing apparatus 100 operates in a replay mode, a replay image is displayed on the first display unit 164, and additional information related to the replay image may be displayed on the second display unit 168.

The additional information may be added when the user captures an image or replays a stored image file, and may include text data, image data, sound data, etc. Furthermore, in an embodiment of the digital photographing apparatus 100 including the GPS module 190, GPS data showing data on the geographic position where the image was captured may be stored as the additional information related to the captured image.

First, according to the method of controlling a digital photographing apparatus, according to the current embodiment, in operation S301, a user interface through which additional information is input to an image that is captured or to an image file stored by the user is provided.

Figure 4:
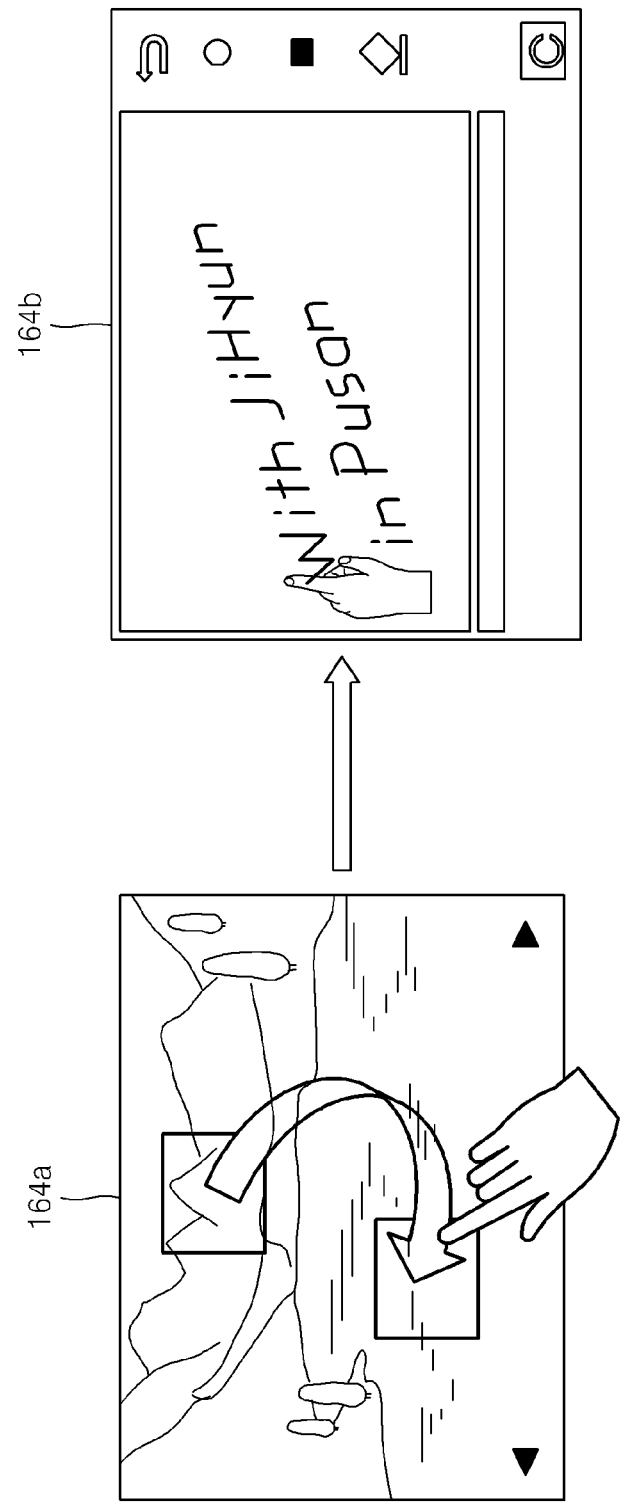
FIG. 4 illustrates an example of a user interface screen through which a user may input additional information.

FIG. 4 illustrates an example of a user interface screen through which a user may input additional information.

The user may input the additional information via a screen where a captured image is displayed or via a screen where a stored image file is reproduced. For example, referring to FIG. 4, when the digital photographing apparatus 100 includes the first display unit 164 formed of a touch screen, a gesture for turning an image over is input to a screen 164a of the first display unit 164 where a reproduced image is displayed, thereby showing a screen 164b where a memo can be written. When the screen 164b for writing a memo is shown, the user may write a desired memo by manipulating a touch screen.

Referring back to FIG. 3, in operation S302, as the user inputs additional information, the additional information is stored. In operation S303, a type of the additional information, an address where the additional information is stored, and/or information on whether additional information exists, are stored in an additional information tag of the captured image or the stored image file to which the user has input the additional information.

Figure 5:
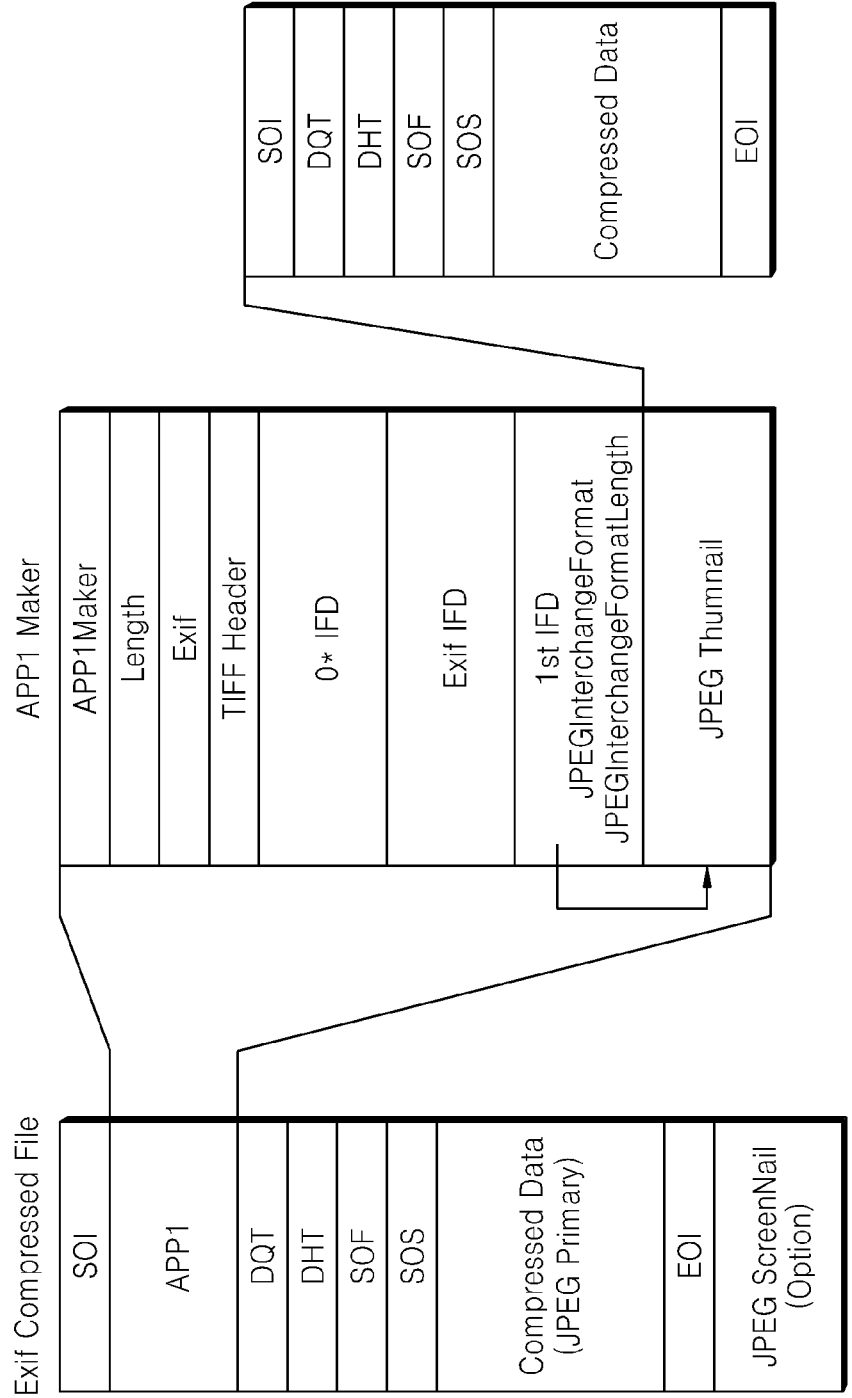
FIG. 5 illustrates a file format of an image file, according to an embodiment.

FIG. 5 illustrates a file format of an image file, according to an embodiment.

An image file may have a format according to an Exif format as illustrated in FIG. 5. An image file compressed according to an Exif format may include an image start marker (SOD, an application mark segment 1 area (APP1) including Exif property information, a quantizing table area (DQT), a Huffman table area (DHT), a frame header area (SOF), a scan header area (SOS), compressed data, an image end marker (EOI), and a JPEG ScreenNail area.

The application mark segment area 1 (APP1) may include APP1 Marker, length, Exif identifier code (Exif), a TIFF header, a 0-th field for writing property information with respect to the compressed image, an Exif field including a maker note (Exif IFD), a first IFD in which information related to a JPEG thumbnail can be stored, and a JPEG thumbnail area. The JPEG thumbnail area may include SOI, DQT, DHT, SOF, SOS, compressed data, EOI, etc.

According to an embodiment, whether additional information exists, a type of the additional information, and/or an address where the additional information is stored, may be stored in a maker note in the Exif field Exif IFD. For example, an additional information tag value may be defined and allocated as below.

```
typedef enum {
    eMEMO_OBJECT_TYPE_NONE = 0,
    eMEMO_OBJECT_TYPE_WITH_BMP = 1,
    eMEMO_OBJECT_TYPE_WITH_TXT = 2,
    eMEMO_OBJECT_TYPE_WITH_GPS = 3,
} eMEMO_OBJECT_TYPE;
```

According to the above definition, an additional information tag value is set as 0 if there is no additional information, as 1 if image-type additional information is present, as 2 if test-type additional information is present, and as 3 if GPS data exists as additional information.

The additional information may be generated as a file having a same base file name as the corresponding image file with a different file extension. For example, when storing additional information regarding an image file named SDC10019.JPG, (i.e., base file name "SDC10019" and an extension "JPG"), a file named SDC10019.bmp or SDC10019.txt may be generated and stored as the additional information. According to another example, the additional information may be stored under the same file name as the replay image file but with a file extension which is assigned to additional information.

Referring back to FIG. 3, when the user selects the captured image or the stored image as a replay image file so as to be replayed, in the method of controlling a digital photographing apparatus, the replay image file is displayed on the first display unit 164 in operation S304. For example, data stored in the JPEG ScreenNail area of the image file is read so as to be displayed on the first display unit 164.

In addition, in operation S305, whether additional information exists with respect to the replayed image file is determined. For example, by searching for an additional information tag value stored in the maker note, whether additional information exists may be determined.

In operation S306, if additional information exists, the additional information is searched for. For example, a file of additional information having the same name as the replay image file is searched for in the data storing unit 150.

In operation S308, when the additional information is searched, the additional information is displayed on the second display unit 168.

Figure 6:
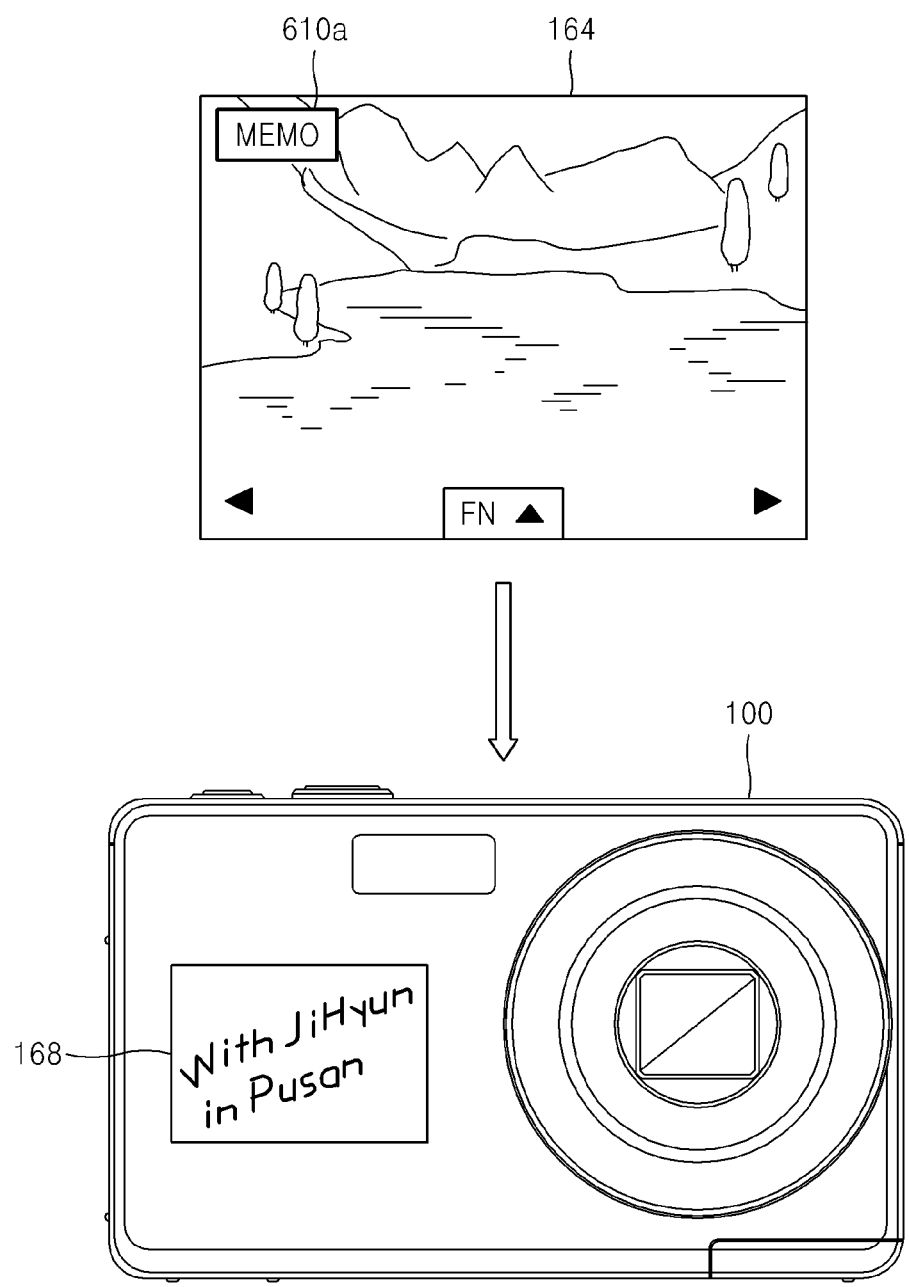
FIG. 6 illustrates a first display unit and a second display unit when replaying an image file including image-type additional information in an image format, according to an embodiment.

FIG. 6 illustrates the first display unit 164 and the second display unit 168 when replaying an image file including image-type additional information in an image format, according to an embodiment. As illustrated in FIG. 6, the replay image file is displayed on the first display unit 164, and the additional information related to the replay image file is displayed on the second display unit 168. Also, an additional information icon 610a indicating that the additional information exists may be displayed with the replay image file on the first display unit 164. The user may recognize from the additional information icon 610a whether additional information related to the replay image file exists, and check the second display unit 168 in order to view the additional information.

Also, the additional information icon 610a may display a type of the additional information (e.g., MEMO).

Figure 7:
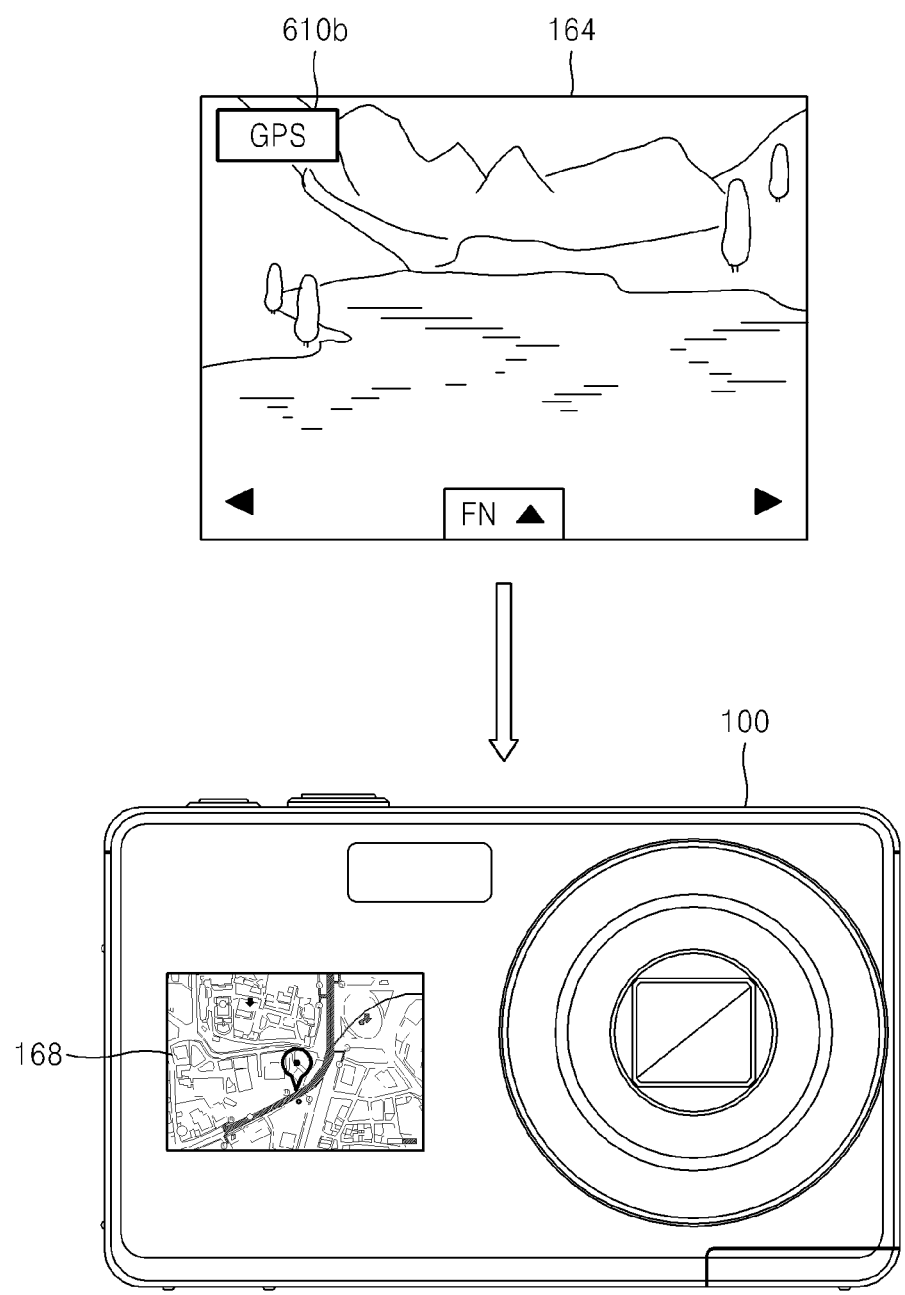
FIG. 7 illustrates a first display unit and a second display unit when replaying an image file including geographic positioning system (GPS) data, according to an embodiment.

FIG. 7 illustrates the first display unit 164 and the second display unit 168 when replaying an image file including GPS data, according to an embodiment. As illustrated in FIG. 7, an additional information icon 610b showing that GPS data are present in a replay image file is displayed on the first display unit 164, and the GPS data may be displayed on the second display unit 168.

Figure 8:
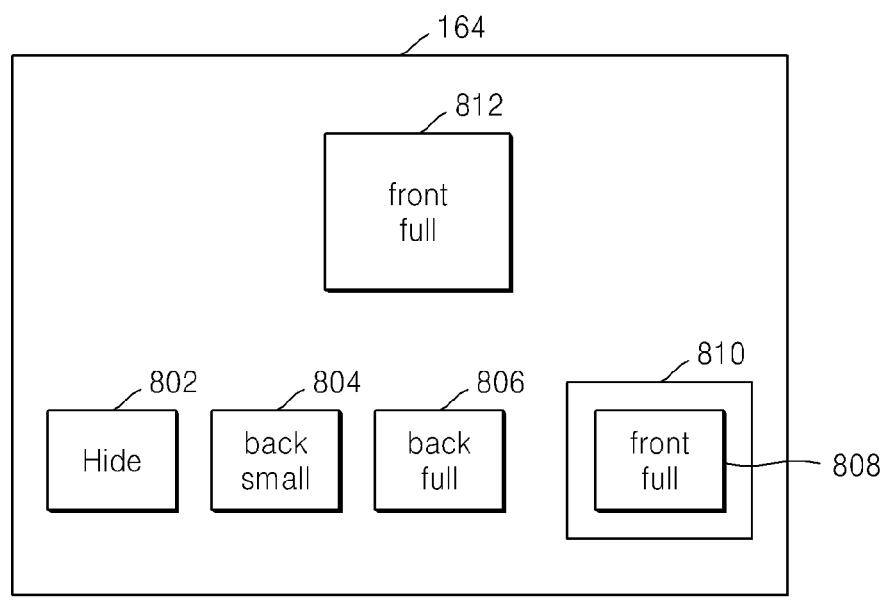
FIG. 8 illustrates a user interface screen for additional information display settings, according to an embodiment.

FIG. 8 illustrates a user interface screen for additional information display settings, according to an embodiment.

According to a method of controlling a digital photographing apparatus according to the current embodiment, a user interface through which the user may select where and how to display additional information may be provided. For example, a user interface may be provided through which an icon HIDE 802 representing a setting for not showing additional information, an icon BACK SMALL 804 representing a setting for minimizing additional information to a portion of the first display unit 164, an icon BACK FULL 806 representing a setting for displaying additional information over the whole screen on the first display unit 164, and an icon FRONT FULL 808 representing a setting for displaying additional information on the second display unit 168 may be selected. The user may select a setting for displaying additional information by using a cursor 810. A current selected setting 812 may also be displayed. Also, the user interface may be provided through the first display unit 164 or the second display unit 168.

FIG. 9 is a flowchart illustrating a method of controlling a digital photographing apparatus, according to another embodiment.

According to the current embodiment, a user interface for controlling the second display unit 168, through which additional information to be displayed on the second display unit 168 is selected, is provided. Accordingly, the user may select the type of additional information displayed on the second display unit 168 if there is a plurality of pieces of additional information related to a replay image file.

According to the method of controlling a digital photographing apparatus, according to the current embodiment, in operation S901, a user interface for inputting additional information, through which the user may input additional information to the captured image or the stored image file, is provided. In operation S902, the additional information input by the user is stored. In operation S903, information related to the additional information is stored in an additional information tag of the captured image or the stored image file. In operation S904, if the user selects a replay image file, the replay image file is displayed on the first display unit 164. If additional information related to the replay image file exists in operation S905, the additional information is searched for in operation S906. The additional information may comprise at least one piece of information, and here all additional information related to the replay image file is searched for.

Next, in operation S908, a user interface for controlling the second display unit 168 through which additional information to be displayed on the second display unit 168 among the searched at least one piece of additional information can be selected, is provided. The user interface for controlling the second display unit 168 may be provided to the first display unit 164, the second display unit 168, or to both the first display unit 164 and the second display unit 168.

Figure 10A:
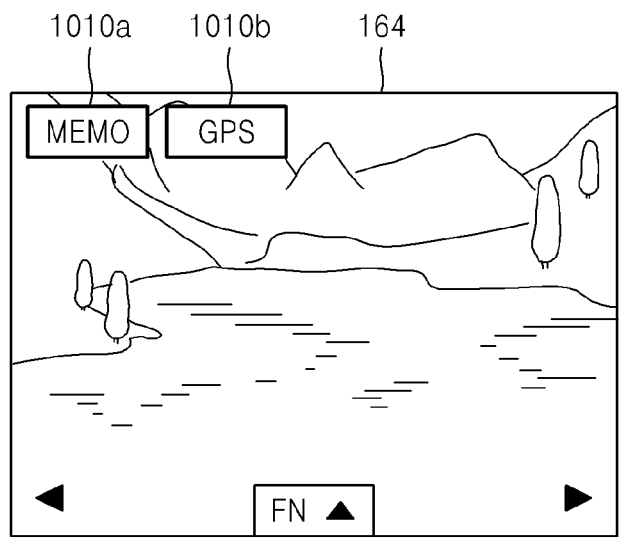
FIGS. 10A and 10B illustrate an example of a user interface screen for controlling the second display unit.
Figure 10B:
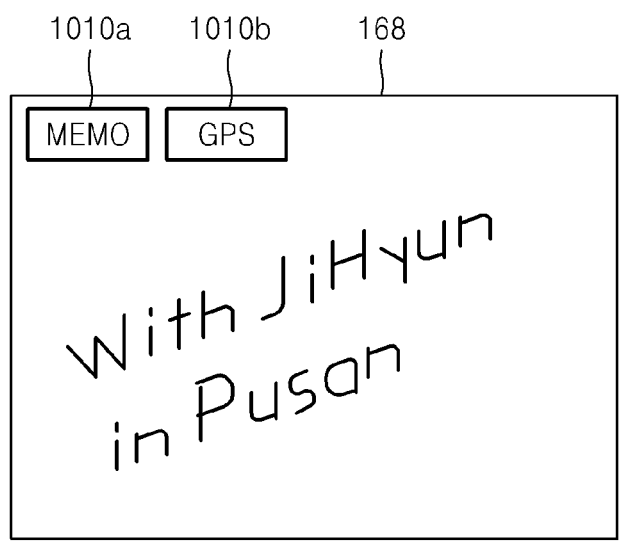

FIGS. 10A and 10B illustrate an example of a user interface screen for controlling the second display unit 168.

The user interface may be provided to the first display unit 164 as illustrated in FIG. 10A. The user interface for controlling the second display unit 168 may comprise additional information selection icons 1010a and 1010b through which additional information can be selected, and the user may select additional information to be displayed on the second display unit 168 by selecting the additional information selection icon 1010a or 1010b by using the manipulation unit 180.

Also, the user interface for controlling the second display unit 168 may be provided to the second display unit 168 as illustrated in FIG. 10B. Accordingly, the user may select additional information to be displayed on the second display unit 168 directly from the second display unit 168 without having to view the first display unit 164.

If a plurality of pieces of additional information exist with respect to the replay image file, even if the user does not select additional information to be displayed on the second display unit 168, standards for determining additional information to be displayed on the second display unit 168 may preferably be determined in advance.

Referring back to FIG. 9, in operation S910, when the user selects additional information to be displayed on the second display unit 168 via the user interface for controlling the second display unit 168, the selected additional information is displayed on the second display unit 168.

Figure 11:
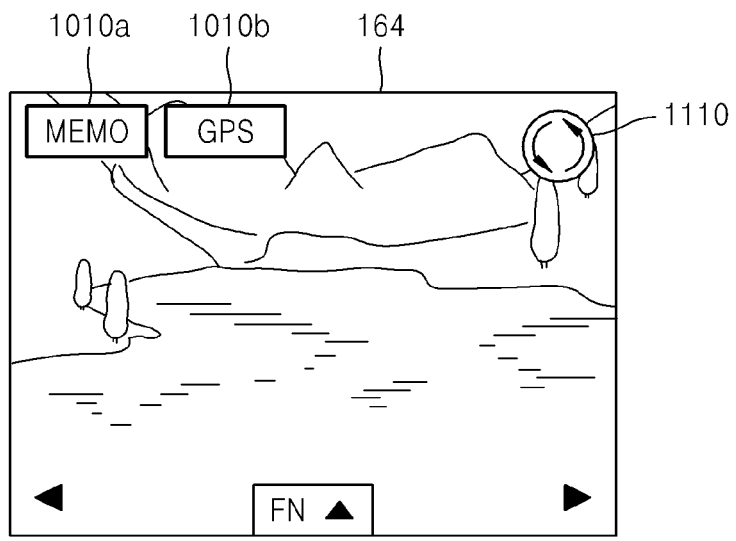
FIG. 11 illustrates a screen of a screen exchange user interface, according to still another embodiment.

FIG. 11 illustrates a screen of a screen exchange user interface, according to still another embodiment.

According to the current embodiment, a screen exchange user interface for exchanging the screen displayed on the first display unit 164 and the screen displayed on the second display unit 168 may be provided. A screen exchange command may be input from a user through the screen exchange user interface. For example, if a replay image file is displayed on the first display unit 164 and additional information related to the replay image file is displayed on the second display unit 168, when the user selects a screen exchange icon 1110, the screens of the first display unit 164 and the second display unit 168 may be exchanged such that the additional information is displayed on the first display unit 164 and the replay image file is displayed on the second display unit 168.

Figure 12:
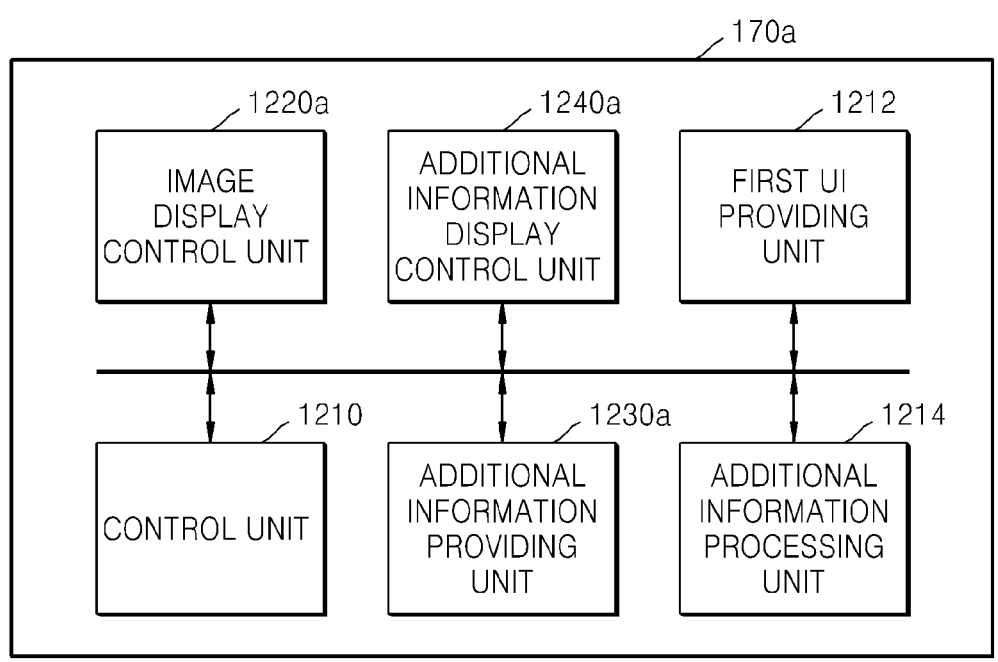
FIG. 12 is a block diagram illustrating a digital signal processing unit of a digital photographing apparatus, according to an embodiment.

FIG. 12 is a block diagram illustrating a digital signal processing unit 170a of a digital photographing apparatus 100, according to an embodiment.

The digital signal processing unit 170a according to the current embodiment includes a control unit 1210, a first user interface providing unit 1212, an additional information processing unit 1214, an image display control unit 1220a, an additional information providing unit 1230a, and an additional information display control unit 1240a.

The control unit 1210 may control the overall operations of the digital photographing apparatus 100. For example, the control unit 1210 may generate a control signal for controlling auto-focusing, zoom changing, focus changing, automatic exposure correction, etc. and provide the same to a lens driving unit 111, an aperture driving unit 113, and an imaging device control unit 116 to control the operations of elements such as a shutter, a flash, etc. included in the digital photographing apparatus 100.

The first user interface providing unit 1212 may provide an additional information input user interface for the user to input additional information to a captured image or a stored image file. For example, the additional information input user interface as illustrated in FIG. 4 may be provided.

When the user inputs additional information, the additional information processing unit 1214 may store the additional information, and information on a type of the additional information, an address where the additional information is stored, and/or whether additional information exists or not may be stored in an additional information tag of the captured image or the stored image file. For example, the additional information tag may be stored as described with reference to FIG. 5.

The image display control unit 1220a may display a replay image file on the first display unit 164. For example, the image display control unit 1220a may read data stored in a JPEG ScreenNail area of an image file to display the data on the first display unit 164.

The additional information providing unit 1230a may determine whether additional information exists with respect to the replay image file or not. For example, by searching for an additional information tag value stored in a maker note, the additional information providing unit 1230a may determined whether the additional information exists or not. Also, if additional information exists, the additional information providing unit 1230a searches for the additional information. For example, an additional information file having the same file name as the replay image file may be searched for by the data storing unit 150.

When the additional information is searched, the additional information providing unit 1230a may display the additional information on the second display unit 168.

Figure 13:
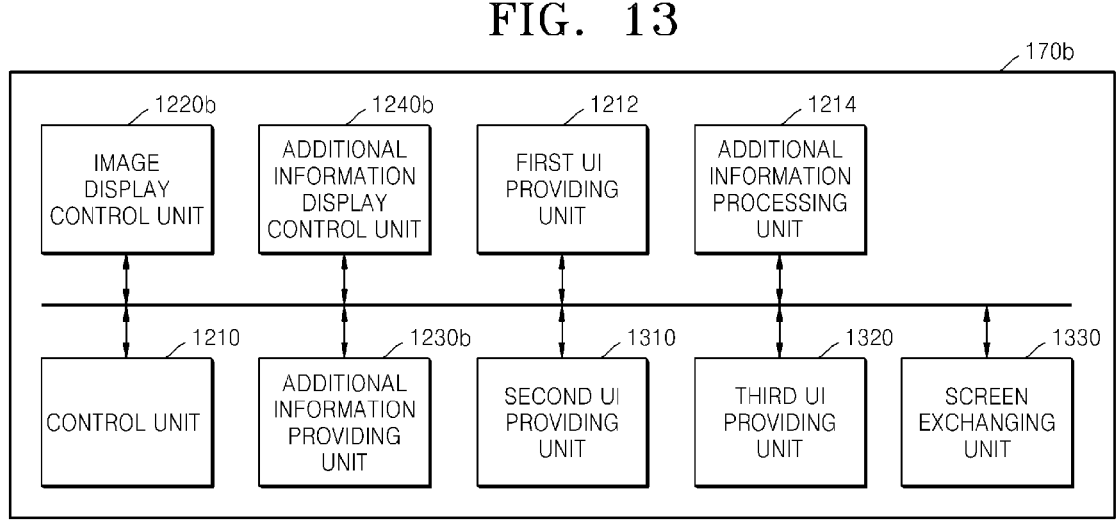
FIG. 13 is a block diagram illustrating a digital signal processing unit of a digital photographing apparatus, according to another embodiment.

FIG. 13 is a block diagram illustrating a digital signal processing unit of a digital photographing apparatus, according to another embodiment.

A digital signal processing unit 170b according to the current embodiment may include a control unit 1210, a first user interface providing unit 1212, an additional information processing unit 1214, an image display control unit 1220b, an additional information providing unit 1230b, an additional information display control unit 1240b, and a second user interface providing unit 1310.

The additional information providing unit 1230b may search for all additional information related to a replay image file, and the additional information may comprise at least one piece of information.

The second user interface providing unit 1310 may provide a second display unit controlling user interface through which additional information to be displayed on the second display unit 168 can be selected among the searched at least one piece of additional information. The second display unit controlling user interface may be provided to the first display unit 164 or the second display unit 168 or to both the first display unit 164 and the second display unit 168.

The digital signal processing unit 170b may further include a third user interface providing unit 1320 and a screen exchanging unit 1330.

The third user interface providing unit 1320 may provide a screen exchange user interface for exchanging a screen displayed on the display unit 164 and a screen displayed on the second display unit 168. For example, the screen exchange user interface may be provided using a screen exchange icon 1110 as illustrated in FIG. 11.

When the user selects the screen exchange icon 1110, the screen exchanging unit 1330 may exchange a screen displayed on the display unit 164 and a screen displayed on the second display unit 168. For example, when a replay image file is displayed on the first display unit 164, and additional information related to the replay image file is displayed on the second display unit 168, and the user selects a screen exchange icon 1110, the screen exchanging unit 1330 may exchange the screens of the first display unit 164 and the second display unit 168 so as to display the additional information on the first display unit 164 and display the replay image file on the second display unit 168. Also, the screen exchanging unit 1330 may control the image display control unit 1220b and the additional information display control unit 1240b such that a replay image file and additional information are respectively displayed on a display unit that is different from a currently displaying display unit.

Embodiments may include software modules which may be recorded and stored as program instructions or computer readable codes executable by a processor on non-transitory computer readable storage media such as read-only memory (ROM), random-access memory (RAM), CD-ROMs, magnetic tapes, floppy disks, and optical data storage devices. The computer readable storage medium can also be distributed over network coupled computer systems so that the computer readable code is stored and executed in a distributed fashion. This media can be read by the computer, stored in the memory, and executed by the processor. Operations included in a method of controlling a digital photographing apparatus may be performed when the computer readable codes are read from the computer readable storage medium via the digital signal processing unit 170.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art. Descriptions of features or aspects within each embodiment should typically be considered as available for other similar features or aspects in other embodiments.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. It will be recognized that the terms "comprising," "including," and "having," as used herein, are specifically intended to be read as open-ended terms of art. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

What is claimed is:

1. A method of controlling a digital photographing apparatus comprising a plurality of display units, the method comprising:
   displaying a replay image file on a first display unit;
   determining whether additional information input by a user as a memo about an image of the replay image file exists in the replay image file;
   searching for the additional information when the additional information exists in the replay image file; and
   displaying the additional information input by the user as a memo about an image of the replay image file on a second display unit,
   wherein the first display unit is disposed on a surface opposite to a surface on which a lens barrel of the digital photographing apparatus is located, and the second display unit is disposed on the surface on which the lens barrel is located.

2. The method of claim 1, further comprising:
   providing a user interface through which the user inputs the additional information as a memo about an image of the replay image file to a captured image or a stored image file;
   storing the additional information input by the user; and
   storing information on a type and an address of the additional information in an additional information tag of the captured image or the stored image file,
   wherein the replay image file is the captured image or the stored image file.

3. The method of claim 2, further comprising displaying an additional information icon that displays the type of the additional information on the first display unit when additional information exists in the replay image file.

4. The method of claim 2, further comprising:
   providing a second display unit controlling user interface when at least one piece of the additional information exists, through which additional information to be displayed on the second display unit among the at least one piece of additional information can be selected; and displaying the selected additional information on the second display unit.

5. The method of claim 2, further comprising:
providing a screen exchange user interface through which a screen displayed on the first display unit and a screen displayed on the second display unit are exchanged in response to a user input; and
exchanging a screen displayed on the first display unit and a screen displayed on the second display unit in response to the user input through the screen exchange user interface.

6. The method of claim 2, wherein the additional information which is added to the replay image file comprises at least one of image data, text data, global positioning system (GPS) data, and sound data.

7. The method of claim 2, wherein the additional information tag comprises at least one piece of information selected from the group consisting of information on whether additional information exists, a type of the additional information, and an address where the additional information is stored;
wherein the step of determining whether the additional information exists comprises searching for the additional information tag of the replay image file; and
wherein the step of storing the additional information comprises storing the additional information under a same base file name as the replay image file with a different file extension.

8. A digital photographing apparatus comprising:
a first display unit;
a second display unit;
an image display control unit that displays a replay image file on the first display unit;
an additional information providing unit that determines whether additional information input by a user as a memo about an image of the replay image file exists in the replay image file, and when the additional information exists, searches for the additional information; and
an additional information display control unit that displays at least one piece of the additional information input by a user as a memo about an image of the replay image file on the second display unit,
wherein the first display unit is disposed on a surface opposite to a surface on which a lens barrel of the digital photographing apparatus is located, and the second display unit is disposed on the surface on which the lens barrel is located.

9. The digital photographing apparatus of claim 8, further comprising:
a first user interface providing unit that provides a first user interface through which a user adds the additional information as a memo about an image of the replay image file to a captured image or a stored image file; and
an additional information processing unit that stores the additional information input by the user, and information on a type and an address of the additional information in an additional information tag of the captured image or the stored image file,
wherein the replay image file is the captured image or the stored image file.

10. The digital photographing apparatus of claim 9, wherein when additional information exists in the replay image file, the first display control unit displays the type of the additional information on the first display unit.

11. The digital photographing apparatus of claim 9, further comprising a second user interface providing unit that, when at least one piece of additional information exists, provides a second display unit controlling user interface through which additional information to be displayed on the second display unit among the at least one piece of additional information can be selected, and wherein the additional information display control unit displays the selected additional information on the second display unit.

12. The digital photographing apparatus of claim 9, further comprising:
a third user interface providing unit that provides a screen exchange user interface through which a screen displayed on the first display unit and a screen displayed on the second display unit are exchanged in response to a user input; and
a screen exchanging unit that exchanges the screen displayed on the first display unit and the screen displayed on the second display unit in response to the user input that is input through the screen exchange user interface.

13. The digital photographing apparatus of claim 9, wherein the additional information which is added to the replay image file comprises at least one of image data, text data, global positioning system (GPS) data, and sound data.

14. The digital photographing apparatus of claim 9, wherein the additional information tag comprises at least one piece of information selected from the group consisting of information on whether additional information exists, a type of the additional information, and an address where the additional information is stored,
wherein the additional information providing unit determines whether the additional information exists by searching the additional information tag of the replay image file, and
wherein the additional information processing unit stores the additional information under a same base file name as the replay image file with a different file extension.

15. A non-transitory computer readable storage medium having stored thereon a computer program executable by a processor for performing a method of controlling a digital photographing apparatus including a first display unit and a second display unit, the method comprising:
displaying a replay image file on the first display unit;
determining whether additional information input by a user as a memo about an image of the replay image file exists in the replay image file;
searching for the additional information, when the additional information exists in the replay image file; and
displaying the additional information input by the user as a memo about an image of the replay image file on the second display unit,
wherein the first display unit is disposed on a surface opposite to a surface on which a lens barrel of the digital photographing apparatus is located, and the second display unit is disposed on the surface on which the lens barrel is located.

16. The computer readable storage medium of claim 15, wherein the method further comprises:
providing a user interface through which the user inputs the additional information as a memo about an image of the replay image file to a captured image or a stored image file;
storing the additional information that is input by the user; and
storing information on a type and an address of the additional information in an additional information tag of the captured image or the stored image file,
wherein the replay image file is the captured image or the stored image file.

17. The computer readable storage medium of claim 16, wherein the method further comprises displaying an icon representing the type of the additional information on the first display unit when additional information exists in the replay image file.

18. The computer readable storage medium of claim 16, wherein the method further comprises:
providing a second display unit controlling user interface when at least one piece of the additional information exists, through which additional information to be displayed on the second display unit among the at least one piece of additional information can be selected; and
displaying the selected additional information on the second display unit.

19. The computer readable storage medium of claim 16, wherein the method further comprises:
providing a screen exchange user interface through which a screen displayed on the first display unit and a screen displayed on the second display unit are exchanged in response to a user input; and
exchanging the screen displayed on the first display unit and the screen displayed on the second display unit in response to the user input that is input through the screen exchange user interface.

20. The computer readable storage medium of claim 16, wherein the additional information which is added to the replay image file comprises at least one of image data, text data, global positioning system (GPS) data, and sound data.

21. The computer readable storage medium of claim 16, wherein the additional information tag comprises at least one piece of information selected from the group consisting of information on whether additional information exists, a type of the additional information, and an address where the additional information is stored,
wherein the step of determining whether the additional information exists comprises searching the additional information tag of the replay image file, and
wherein the step of storing the additional information comprises storing the additional information under a same base file name as the replay image file with a different file extension.

22. A method of controlling a digital photographing apparatus comprising a plurality of display units, the method comprising:
displaying a replay image file on a first display unit;
determining whether additional information exists in the replay image file;
searching for the additional information when the additional information exists in the replay image file;
displaying the additional information on a second display unit;
providing a screen exchange user interface through which a screen displayed on the first display unit and a screen displayed on the second display unit are exchanged with each other in response to a user input; and
exchanging a screen displayed on the first display unit and a screen displayed on the second display unit with each other in response to the user input through the screen exchange user interface.

23. The method of claim 22, further comprising:
providing a user interface through which the user inputs the additional information to a captured image or a stored image file;
storing the additional information input by the user; and
storing information on a type and an address of the additional information in an additional information tag of the captured image or the stored image file,
wherein the replay image file is the captured image or the stored image file.

24. The method of claim 23, further comprising displaying an additional information icon that displays the type of the additional information on the first display unit when additional information exists in the replay image file.

25. The method of claim 23, further comprising:
providing a second display unit controlling user interface when at least one piece of the additional information exists, through which additional information to be displayed on the second display unit among the at least one piece of additional information can be selected; and
displaying the selected additional information on the second display unit.

26. The method of claim 23, wherein the additional information which is added to the replay image file comprises at least one of image data, text data, global positioning system (GPS) data, and sound data.

27. The method of claim 23, wherein the additional information tag comprises at least one piece of information selected from the group consisting of information on whether additional information exists, a type of the additional information, and an address where the additional information is stored;
wherein the step of determining whether the additional information exists comprises searching for the additional information tag of the replay image file; and
wherein the step of storing the additional information comprises storing the additional information under a same base file name as the replay image file with a different file extension.

28. The method of claim 23, wherein the first display unit is disposed on a surface opposite to a surface on which a lens barrel of the digital photographing apparatus is located, and the second display unit is disposed on the surface on which the lens barrel is located.

29. A digital photographing apparatus comprising:
a first display unit;
a second display unit;
an image display control unit that displays a replay image file on the first display unit;
an additional information providing unit that determines whether additional information exists in the replay image file, and when additional information exists, searches for the additional information;
an additional information display control unit that displays at least one piece of the additional information on the second display unit;
a third user interface providing unit that provides a screen exchange user interface through which a screen displayed on the first display unit and a screen displayed on the second display unit are exchanged in response to a user input; and
a screen exchanging unit that exchanges the screen displayed on the first display unit and the screen displayed on the second display unit in response to the user input that is input through the screen exchange user interface.

30. The digital photographing apparatus of claim 29, further comprising:
a first user interface providing unit that provides a first user interface through which a user adds the additional information to a captured image or a stored image file; and
an additional information processing unit that stores the additional information input by the user, and information on a type and an address of the additional information in an additional information tag of the captured image or the stored image file, wherein the replay image file is the captured image or the stored image file.

31. The digital photographing apparatus of claim 30, wherein when additional information exists in the replay image file, the first display control unit displays the type of the additional information on the first display unit.

32. The digital photographing apparatus of claim 30,
further comprising a second user interface providing unit that, when at least one piece of additional information exists, provides a second display unit controlling user interface through which additional information to be displayed on the second display unit among the at least one piece of additional information can be selected, and
wherein the additional information display control unit displays the selected additional information on the second display unit.

33. The digital photographing apparatus of claim 30, wherein the additional information which is added to the replay image file comprises at least one of image data, text data, global positioning system (GPS) data, and sound data.

34. The digital photographing apparatus of claim 30, wherein the additional information tag comprises at least one piece of information selected from the group consisting of information on whether additional information exists, a type of the additional information, and an address where the additional information is stored,
wherein the additional information providing unit determines whether the additional information exists by searching the additional information tag of the replay image file, and
wherein the additional information processing unit stores the additional information under a same base file name as the replay image file with a different file extension.

35. The digital photographing apparatus of claim 30, wherein the first display unit is disposed on a surface opposite to a surface on which a lens barrel of the digital photographing apparatus is located, and the second display unit is disposed on the surface on which the lens barrel is located.

36. A non-transitory computer readable storage medium having stored thereon a computer program executable by a processor for performing a method of controlling a digital photographing apparatus including a first display unit and a second display unit, the method comprising:
displaying a replay image file on the first display unit;
determining whether additional information exists in the replay image file;
searching for the additional information, when the additional information exists in the replay image file;
displaying the additional information on the second display unit;
providing a screen exchange user interface through which a screen displayed on the first display unit and a screen displayed on the second display unit are exchanged with each other in response to a user input; and
exchanging the screen displayed on the first display unit and the screen displayed on the second display unit with each other in response to the user input that is input through the screen exchange user interface.

* * * * *